E. C. BOOTH.
PEANUT ROASTER.
APPLICATION FILED SEPT. 15, 1919.
1,350,541.
Patented Aug. 24, 1920.
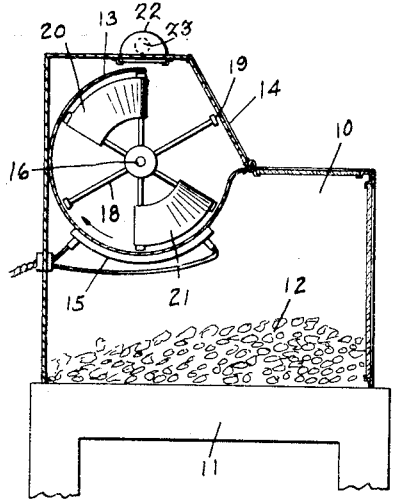
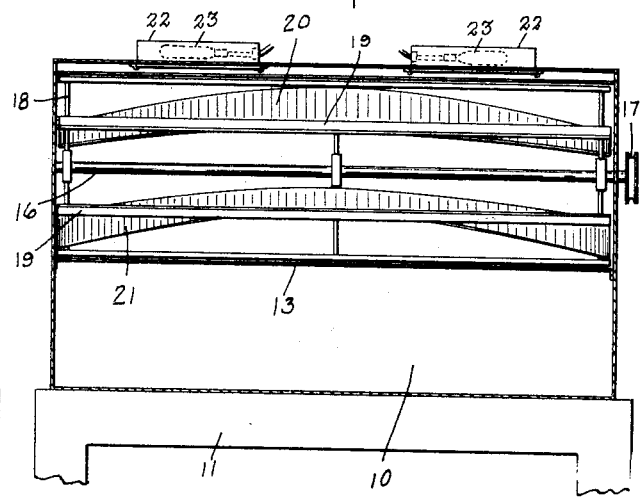
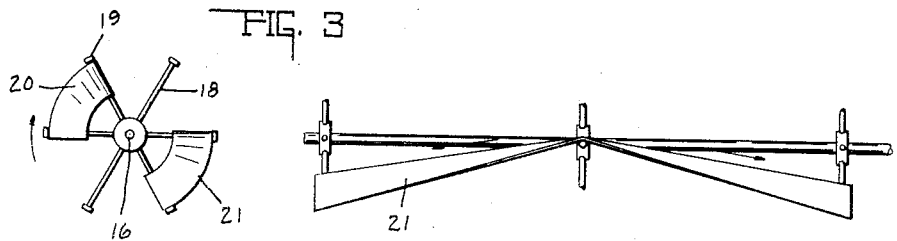
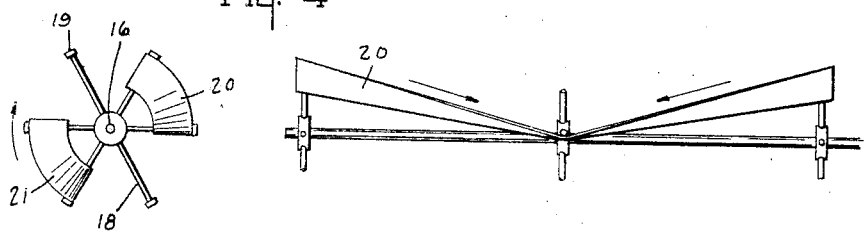
INVENTOR.
EARL C. BOOTH
BY
*Lockwood Lockwood*
ATTORNEYS.

UNITED STATES PATENT OFFICE.

EARL C. BOOTH, OF INDIANAPOLIS, INDIANA, ASSIGNOR TO HOLCOMB & HOKE MANUFACTURING COMPANY, A CORPORATION OF INDIANA.

PEANUT-ROASTER.

1,350,541.  Specification of Letters Patent.  Patented Aug. 24, 1920.

Application filed September 15, 1919. Serial No. 323,775.

*To all whom it may concern:*

Be it known that I, EARL C. BOOTH, a citizen of the United States, and a resident of Indianapolis, county of Marion, and State of Indiana, have invented a certain new and useful Peanut-Roaster; and I do hereby declare that the following is a full, clear, and exact description thereof, reference being had to the accompanying drawings, in which like numerals refer to like parts.

This invention relates to a peanut roaster wherein the peanuts are roasted in a drum heated by external means, being continuously agitated therein by a set of revolving paddles, the roasting drum and paddles being mounted in a show-case containing the roasted peanuts for display and vending.

The main object of this invention relates to a means upon the paddle for causing the peanuts to be distributed lengthwise of the roasting drum, and then gathered toward the center thereof so as to cause them to oscillate back and forth between the center and the end of the drum. This is accomplished by means of connecting strips or plates oppositely mounted on the spokes of the paddles in such a way that the peanuts will be carried on their inverted surfaces, one plate extending downwardly from the center to each end, and the other from each end toward the center.

In the drawings, which are made a part of this application, Figure 1 is an end elevation with the end paddle removed. Fig. 2 shows a front elevation of the machine. Fig. 3 is a diagrammatic view showing an end view and front elevation of the web in inverted position extending downward from the center. Fig. 4 is the same as Fig. 3 showing the reverse thereof with the web extending downward toward the center.

In the drawings there is shown a peanut roaster having a transparent glass show-case or receptacle 10 supported upon a base or stand 11 in which is contained a plurality of roasted peanuts for display or vending purposes. Mounted in the rear upper portion of the show-case there is a roasting cylinder or drum 13 inclosed therein by hinged doors 14. Mounted on the lower side of the roasting cylinder, and extending the full length thereof, there is an electric heating element 15 which heats the lower portion of said cylinder for roasting the peanuts coming in contact therewith. Mounted within the cylinder 13 there is a shaft 16 which is slowly revolved by a pulley 17, driven by any suitable means not shown herein, said shaft 16 having a plurality of spokes 18 extending radially therefrom at each end and at the center. Connecting the ends of the corresponding spokes at opposite ends of the cylinder, and in the center thereof there are paddle strips 19 which extend parallel to the axis of, and for the full length of said cylinder, and in close proximity with the inner surface so that as the paddles are revolved the peanuts will be carried past the heating surface.

Mounted upon the spokes there are a plurality of plates 20 and 21 secured at their ends to the end spokes 18 and passing around the next set of center spokes out of the same plane with the end spokes so as to form a curved surface sloping upwardly or downwardly as the case may be from the ends of the cylinder to the center thereof As the paddles are revolved clockwise, as shown in Fig. 1, the peanuts carried on the bottom of the cylinder will be pushed rearwardly and upwardly by the plate 21 which will cause them to roll from the ends toward the center and be carried around until said plate 21 is in its elevated position, in which case they will be dumped from the center thereof and fall down into the center portion of the bottom of the cylinder, to be engaged by the plate 20 as it comes around and be pushed upwardly in a clockwise direction and spread from the center of the cylinder to the ends whereby the constant agitation of the peanuts is such that they will be alternately pushed from the center to the ends, and from the ends to the center so as to cause them to be more uniformly roasted, agitating them both around the inner surface of the cylinder and longitudinally thereof.

Whereas peanuts have been specifically referred to as the material contained in the cylinder and roasted therein, it will be understood that this invention is in no way restricted or limited to the roasting of peanuts, which has simply been used herein as an example, but equally adaptable to all or any other substances which may be roasted in this manner. This mechanism is particularly adaptable to roasting coffee, cereals and other granular products.

Mounted on the top of the receptable 10 near the front edge thereof there are reflectors 22 in which are contained electric lamps 23 suitably connected with the source of current which project and reflect a light down through the glass door 14 into the revolving cylinder 13 for illuminating the contents thereof.

The invention claimed is:

1. A roasting machine having a cylindrical drum, means for heating the surface of said drum, and a plurality of convex plates extending from end to end of said drum revolving therein for agitating the material to be roasted and causing said material to be moved longitudinally of said plates and distributed from the center to the ends on one plate and from the ends to the center on the other plate.

2. A roasting machine having a cylindrical drum, means for heating the surface of said drum for roasting the contents thereof, revolving means for causing said contents to pass around the inner wall thereof, and laterally extending plates carried by said means extending throughout the length of said drum for alternately carrying said contents outwardly toward the ends and inwardly toward the center, whereby a uniform roasting will be effected.

3. A roasting machine having a cylindrical drum, means for heating the surface of said drum for roasting the contents thereof, a paddle wheel having a plurality of spokes thereon adapted to revolve within said drum, means for revolving said paddle wheel whereby the contents will be carried about the inner surface thereof, and a plate secured at each end to end spokes and passing over a diagonally mounted spoke near its center for causing said contents to be distributed toward the ends of said drum or gathered toward the center thereof whereby a uniform roasting will be effected.

4. A roasting machine having a cylindrical drum, means for heating the surface of said drum for roasting the contents thereof, a paddle wheel having a plurality of spokes thereon adapted to revolve within said drum, paddle strips mounted on the end of said spokes for carrying the material about the inner surface of said drum, means for driving said paddle wheel and a plurality of plates mounted upon said spokes having their ends secured on the end spokes of said wheel within the same plane, and their centers supported on the center strips thereof in another plane whereby the material will be gathered and distributed outwardly or gathered inwardly upon said plates for maintaining a more uniform roasting.

In witness whereof, I have hereunto affixed my signature.

EARL C. BOOTH.